United States Patent
Romanski

(10) Patent No.: US 7,011,731 B2
(45) Date of Patent: Mar. 14, 2006

(54) LONG NIP PRESS BELT MADE FROM THERMOPLASTIC RESIN-IMPREGNATED FIBERS

(75) Inventor: Eric Romanski, Clifton Park, NY (US)

(73) Assignee: Albany International Corp., Albany, NY (US)

( * ) Notice: Subject to any disclaimer, the term of this patent is extended or adjusted under 35 U.S.C. 154(b) by 80 days.

(21) Appl. No.: 10/612,230

(22) Filed: Jul. 2, 2003

(65) Prior Publication Data

US 2005/0003177 A1   Jan. 6, 2005

(51) Int. Cl.
 D21F 3/00   (2006.01)
 B32B 5/28   (2006.01)
 B29C 70/30  (2006.01)

(52) U.S. Cl. ............... 162/358.4; 162/901; 156/137; 156/154; 156/189; 156/195; 428/107; 428/113; 428/167; 428/295.1; 428/297.4; 264/162; 264/172.19; 264/348; 264/495; 264/496

(58) Field of Classification Search ........... 162/348, 162/358.1, 358.2, 358.3, 358.4, 900–904; 428/35.7, 36.1, 36.8, 36.9, 36.91, 36.92, 428/113, 114, 167, 172, 295.1, 297.4, 105–112; 156/86, 137, 153, 154, 157, 158, 166–181, 156/184–195; 264/165, 171.13, 172.19, 264/212, 213, 239, 241, 271.1, 279.1, 308, 264/319, 280, 494, 495, 496, 39, 348, 162
See application file for complete search history.

(56) References Cited

U.S. PATENT DOCUMENTS

| | | | |
|---|---|---|---|
| 3,126,876 A * | 3/1964 | Tyhurst ............... 123/206 |
| 3,734,795 A | 5/1973 | Griffith |
| 4,136,715 A * | 1/1979 | McCormack et al. ...... 138/130 |
| 4,470,860 A * | 9/1984 | Gill et al. ............ 156/175 |
| 4,938,824 A * | 7/1990 | Youngkeit ............. 156/173 |
| 5,753,085 A | 5/1998 | FitzPatrick ........... 162/358.4 |
| 5,792,323 A | 8/1998 | Grondahl ............. 162/358.4 |
| 5,833,898 A | 11/1998 | Dutt ................... 264/102 |
| 5,891,560 A | 4/1999 | Edwards et al. ........ 428/295 |
| 5,976,307 A | 11/1999 | Cook, Jr. ............. 156/344 |
| 6,027,615 A | 2/2000 | Davenport et al. ..... 162/358.2 |
| 6,042,695 A | 3/2000 | Ishino ................. 162/358.4 |
| 6,086,719 A * | 7/2000 | Hasegawa et al. ..... 162/358.4 |
| 6,099,781 A | 8/2000 | Ampulski ............. 264/257 |

(Continued)

FOREIGN PATENT DOCUMENTS

EP    1 096 065    5/2001

(Continued)

*Primary Examiner*—Eric Hug
(74) *Attorney, Agent, or Firm*—Frommer Lawrence & Haug LLP; Ronald R. Santucci

(57) ABSTRACT

Provided is a method for manufacturing a papermaking belt structure using tapes made of a solid thermoplastic resin surrounding a fibrous matrix. The method calls for applying a layer of CD oriented tapes to a mandrel surface, then applying a layer of MD oriented tapes over the CD layer, applying pressure and heat to the mandrel containing the CD and MD layers so to melt the resin and entirely bond/ encapsulate the fibrous matrix. The belt structure thus obtained may thereafter be grooved, drilled or other processed as desired. Additionally, the above method can be reversed as to the MD/CD order of layering. Also, a layer entirely of resin can be applied, preferably prior to, but also after or in between the MD/CD layers. Also, rubber can comprise one or more layers.

32 Claims, 4 Drawing Sheets

U.S. PATENT DOCUMENTS

| | | | |
|---|---|---|---|
| 6,217,964 B1 | 4/2001 | Ndebi et al. | |
| 6,287,498 B1 * | 9/2001 | Schlueter et al. | 264/137 |
| 6,362,300 B1 | 3/2002 | Araki et al. | 528/28 |
| 6,419,795 B1 | 7/2002 | Dutt | 162/358.4 |
| 2004/0219346 A1 * | 11/2004 | Gustafson et al. | 428/292.1 |

FOREIGN PATENT DOCUMENTS

| | | |
|---|---|---|
| EP | 1 109 072 | 6/2001 |
| GB | 11578 | 0/1901 |
| WO | WO95/25200 | 9/1995 |
| WO | WO 03/097932 | 11/2003 |

* cited by examiner

LONG NIP PRESS BELT MADE FROM THERMOPLASTIC RESIN-IMPREGNATED FIBERS

FIELD OF THE INVENTION

The present invention is directed towards a method for manufacturing a papermaking belt structure out of pre-impregnated tapes. More specifically, the tapes contain a unique thermoplastic resin and a fibrous matrix.

BACKGROUND OF THE INVENTION

During the papermaking process, a cellulosic fibrous web is formed by depositing a fibrous slurry, that is, an aqueous dispersion of cellulose fibers, onto a moving forming fabric in the forming section of a paper machine. A large amount of water is drained from the slurry through the forming fabric, leaving the cellulosic fibrous web on the surface of the forming fabric.

The newly formed cellulosic fibrous web proceeds from the forming section to a press section, which includes a series of press nips. The cellulosic fibrous web passes through the press nips supported by a press fabric, or, as is often the case, between two such press fabrics. In the press nips, the cellulosic fibrous web is subjected to compressive forces which squeeze water therefrom, and which adhere the cellulosic fibers in the web to one another to turn the cellulosic fibrous web into a paper sheet. The water is accepted by the press fabric or fabrics and, ideally, does not return to the paper sheet.

The paper sheet finally proceeds to a dryer section, which includes at least one series of rotatable dryer drums or cylinders, which are internally heated by steam. The newly formed paper sheet is directed in a serpentine path sequentially around each in the series of drums by a dryer fabric, which holds the paper sheet closely against the surfaces of the drums. The heated drums reduce the water content of the paper sheet to a desirable level through evaporation.

It should be appreciated that the forming, press and dryer fabrics all take the form of endless loops on the paper machine and function in the manner of conveyors. It should further be appreciated that paper manufacture is a continuous process which proceeds at considerable speeds. That is to say, the fibrous slurry is continuously deposited onto the forming fabric in the forming section, while a newly manufactured paper sheet is continuously wound onto rolls after it exits from the dryer section.

Traditionally, press sections have included a series of nips formed by pairs of adjacent cylindrical press rolls. In recent years, the use of long nip presses has been found to be advantageous over the use of nips formed by pairs of adjacent press rolls. This is because the longer the time a cellulosic fibrous web can be subjected to pressure in the nip, the more water can be removed there, and, consequently, the less water will remain behind in the web for removal through evaporation in the dryer section.

The present invention relates to long nip presses of the shoe type. In this variety of long nip press, the nip is formed between a cylindrical press roll and an arcuate pressure shoe. The latter has a cylindrically concave surface having a radius of curvature close to that of the cylindrical press roll. When the roll and shoe are brought into close physical proximity to one another, a nip, which can be five to ten times longer in the machine direction than one formed between two press rolls, is formed. This increases the so-called dwell time of the cellulosic fibrous web in the long nip while maintaining an adequate level of pressure per square inch of pressing force. The result of this long nip technology has been a dramatic increase in dewatering of the cellulosic fibrous web in the long nip when compared to conventional press nips on paper machines.

A long nip press of the shoe type requires a special belt, such as that shown in commonly assigned U.S. Pat. No. 5,238,537 to Dutt. This belt is designed to protect the press fabric supporting, carrying and dewatering the cellulosic fibrous web from the accelerated wear that would result from direct, sliding contact over the stationary pressure shoe. Such a belt must be provided with a smooth, impervious surface that rides, or slides, over the stationary shoe on a lubricating film of oil. The belt moves through the nip at roughly the same speed as the press fabric, thereby subjecting the press fabric to minimal amounts of rubbing against the surface of the belt.

Traditional methods of making a long nip press belt involve the use of yarns and liquid resin systems. In particular, there are three known methods for fabricating a belt using these materials. The first method uses a two-roll system in which an endless woven substrate is coated with a liquid urethane resin. The second method employs a building mandrel upon which reinforcing yarns are laid up on the outside surface of the mandrel in an array essentially 90 degrees to each and then totally encapsulated with liquid urethane resin. The third method is similar to the second with the difference being that the inside surface of a mandrel is used to lay the strands and pour the resin to form the belt.

With all three methods, the yarns used to reinforce the structure are either monofilament or multifilaments and are positioned in the resin to protect their integrity. Due to the relatively large size of the reinforcing yarns and the amount of resin material required to encapsulate the yarns, the caliper of the belt can become prohibitively thick. This is especially so in the case of grooved or blind drilled belts which require additional resin caliper into which the grooves or holes are machined.

The present invention solves this problem by forming a belt using pre-impregnated tape. The tape comprises individual filaments laid side by side in a ribbon like fashion, and encapsulated and protected with thermoplastic resin (see FIG. 1) The use of thermoplastic-impregnated filaments enables rein-forcing elements to be put into a belt structure without substantially increasing the belt caliper. These individual filaments are smaller than yarns that are comprised of bundles of filament, as used in the manufacture of conventional belts. This "prepreg" tape is the building block of the present invention.

SUMMARY OF THE INVENTION

The present invention is a method for manufacturing a papermaking belt structure by providing tapes, each made of solid thermoplastic resin surrounding a fibrous matrix. One example of the method calls for applying a layer of CD oriented tapes to a mandrel surface, then applying a layer of MD oriented tapes over the CD layer, applying pressure and heat to the mandrel containing the CD and MD layers so to melt the thermoplastic resin and bond/encapsulate the fibrous matrix. The belt structure thus obtained may thereafter be grooved, drilled or otherwise treated as desired.

Alternatively, the above method can be reversed as to the MD/CD order of layering. Also, a layer entirely of resin is preferably applied to the mandrel before applying the MD and CD tapes. In addition, one or more resin layers can be applied after, or in between, the MD and CD tapes. This resin layer can be rubber in one or all layers as well.

BRIEF DESCRIPTION OF THE DRAWINGS

Thus by the present invention, its objects and advantages will be realized, the description of which should be taken in conjunction with the drawings wherein.

DETAILED DESCRIPTION OF THE PREFERRED EMBODIMENT

Figure 1:
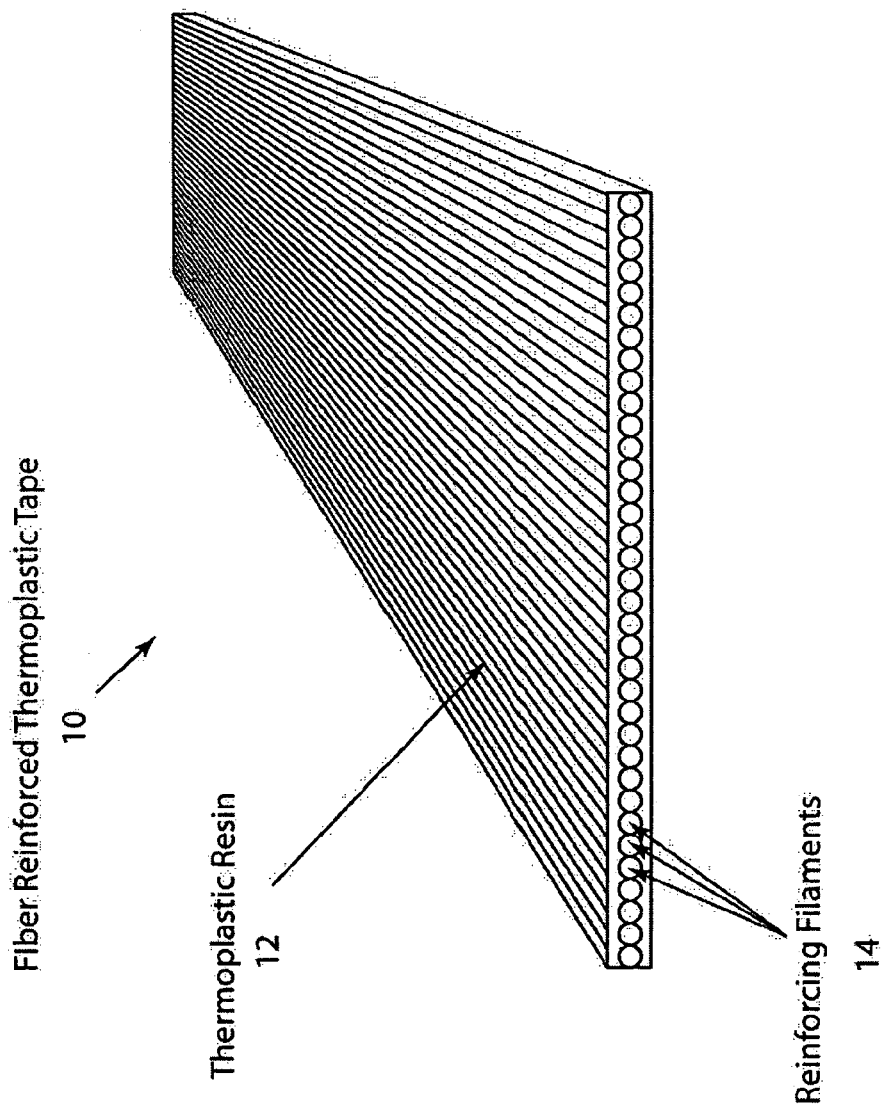
FIG. 1 is a schematic representation of a fiber reinforced thermoplastic tape used in the manufacture of the belt according to the present invention.

FIG. 1 illustrates a fiber reinforced thermoplastic tape 10 used in manufacturing the belt of the present invention. The tape 10 comprises a unique solid thermoplastic elastomeric resin 12 containing irradiation activated cross linking compounds. The resin 12 surrounds a fibrous matrix 14 that can take on a variety of forms. Examples of the matrix material 14 include continuous fiber filaments, woven tapes, and knitted tapes with continuous reinforcing threads. However, continuous fiber filaments 14, as shown in FIG. 1, offer the best reinforcement, as they do not rely on resin bonding to obtain their strength. That is, if for some reason the resin 12 looses its integrity, the filaments 14 still provide reinforcement.

Figure 2:
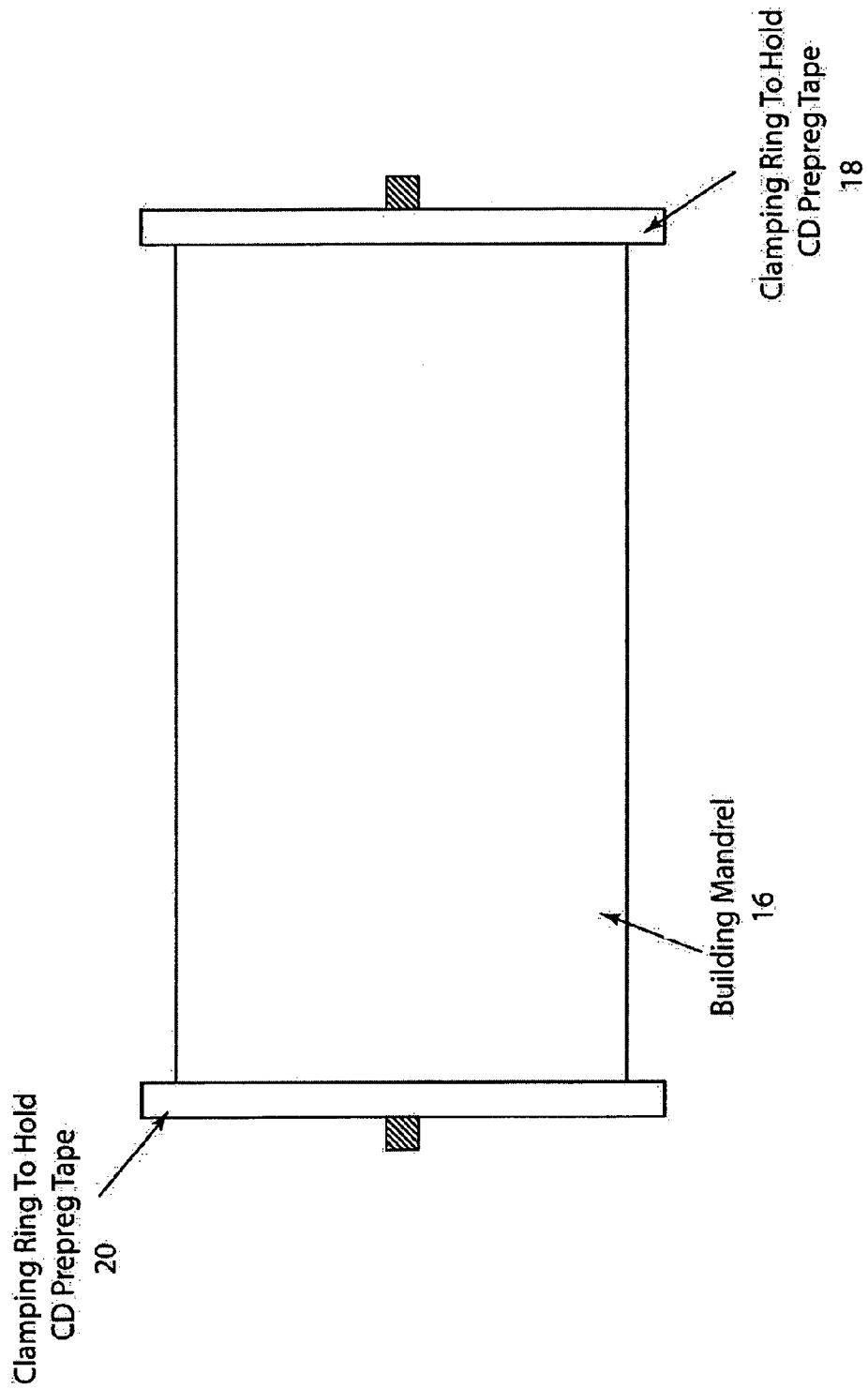
FIG. 2 is a diagram of a building mandrel used in the production of the inventive belt.
Figure 3:
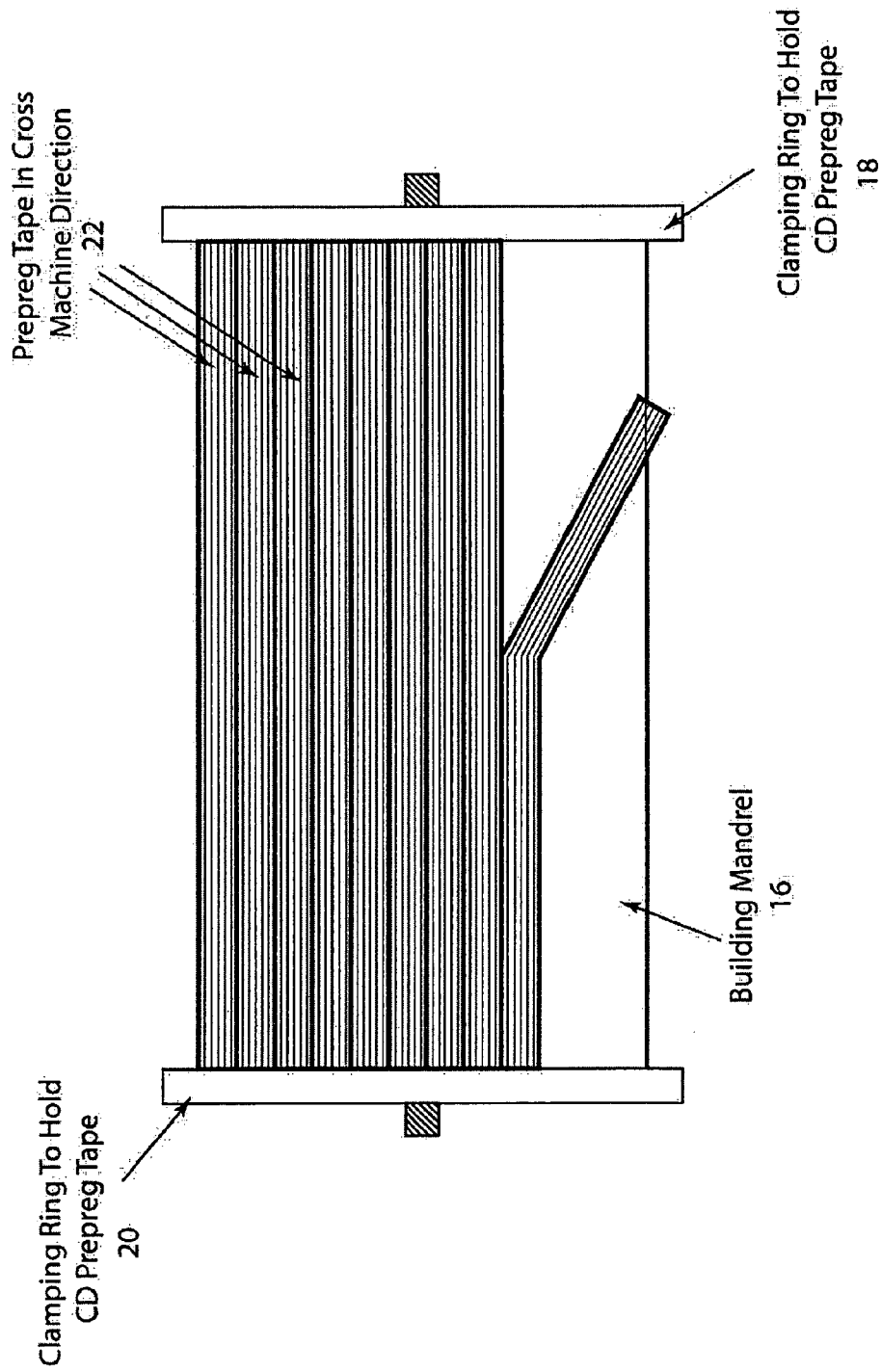
FIG. 3 is an illustration of the mandrel of FIG. 2 with the tape of FIG. 1 applied thereto in a cross machine direction.
Figure 4:
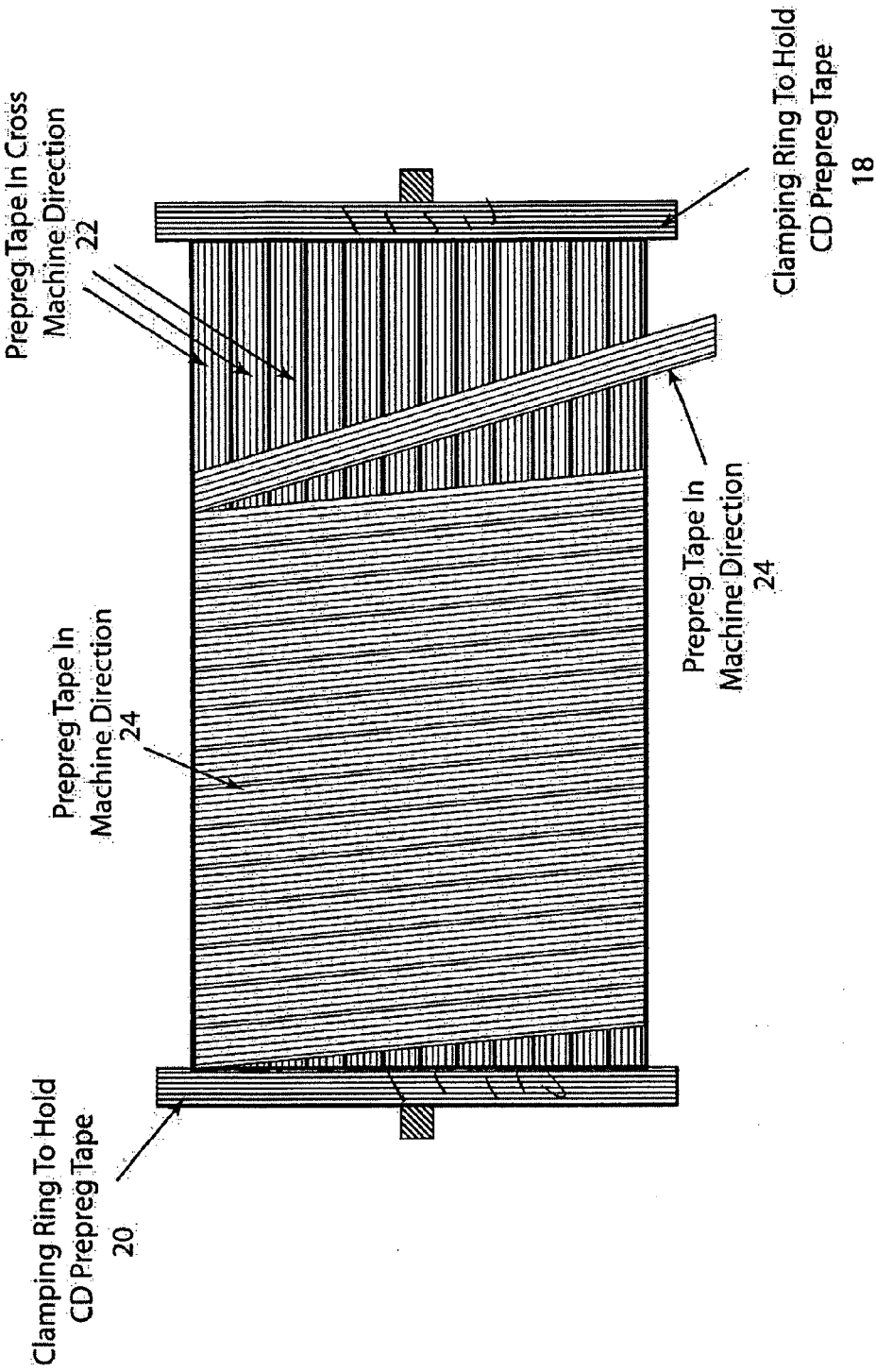
FIG. 4 is a representation showing the mandrel of FIG. 3 with additional tape applied thereto in the machine direction.

To form the tape 10, any one of the aforementioned matrix materials 14 is impregnated, for example, via a heated die, with the unique thermoplastic elastomeric resin 12. Upon completion, the "prepreg" 10, as it is called, is in solid form and of a fixed cross section. As shown in FIGS. 2–4, this prepreg 10, is used to lay an array of both MD and CD oriented tapes 22, 24 onto a building mandrel 16. The mandrel 16 containing the MD and CD array of prepreg tapes 22, 24 is then wrapped with a woven tape or shrinkable film (not shown) to supply pressure during a subsequent heating process. This heating process re-liquefies the thermoplastic resin 12 and creates a homogeneous resin encapsulation of all the MD and CD yarns 14. Once the mandrel 16 containing the now homogeneous resin and yarn reinforcement is cooled, any imperfections such as air bubbles may be repaired by re-melting the affected area with a hot tool. Once any imperfections are repaired, the resin 12 can be treated in an appropriate manner to cross-link the resin 12 into a thermoset material. The surface of the belt structure thus obtained may then be machined to create lands and grooves of a desired caliper and spacing, or blind drilled holes or other methods to create desired surface voids.

One example of the aforementioned method of manufacturing the belt will now be described in further detail. Initially, as shown in FIG. 3, the tapes 22 are laid on the entire mandrel surface first in the CD direction, and held in place by the clamping rings 18, 20 at each shoulder of the mandrel 16. In this connection, care is taken to ensure that adjacent tapes 22 abut each other without void areas therebetween. Once the CD prepreg tapes 22 cover the entire surface of the mandrel 16, the MD tapes 24 are then spiral wound over the CD tapes 22, again making sure that adjacent spirals abut each other as shown in FIG. 4. Note that this MD tape 24 is fastened to the clamping rings 18, 20 at the beginning and at the end of the wind.

It should be understood that the MD/CD order of layering can be reversed. In addition, a layer entirely of resin is preferably applied to the mandrel before applying the tapes 22, 24. Note further that, in the case greater belt caliper is required to create groove or blind drilled void volume, a tape made of 100% thermoplastic resin (not shown) can be applied prior to, or after, the prepreg MD and CD tapes 22, 24 are in place. This resin layer can also be applied between the MD/CD layers but not fully cured. Up to several layers of this non-fiber reinforced thermoplastic resin may be applied if necessary. The resin layer can be rubber in one or all layers as well.

Once the mandrel 16 is "dressed" with the prepreg tape 22, 24, it is ready to be heat treated so to melt the thermoplastic resin 12 and bond the entire matrix. Prior to heat treating however, the dressed mandrel is wrapped with a shrinkable film that holds and supplies pressure to all the components. The wrapped mandrel (not shown) is then placed in an autoclave or a similar heating chamber. However, induction heating, infrared, hot air or other suitable means for the purpose may also be used to melt-flow the resin 12 without immersing the entire mandrel in a hot atmosphere. Note that the heat required to make the resin 12 flow is determined by the type of resin 12 used to make the prepreg 10.

Once the resin 12 has been sufficiently heated to promote resin flow, the belt can be cooled to solidify the resin 12. Subsequently, due to the thermoplastic nature of the resin 12, defects such as small voids in resin bond areas can be repaired via heat and additional resin (not shown). The belt structure thus obtained is then ready to have its surface ground to a uniform caliper, using, for example, conventional grinding equipment. Grooves or blind drilled holes may be formed thereafter if desired.

Additionally, it is noted that there is a family of thermosetting resins that when subjected to temperatures above their melting point will cross link and become thermoset. This type of resin can also be used in the fabrication of the belt and is the preferred material.

There are key differences between the present invention and that disclosed in U.S. Pat. No. 5,507,899 (Yamauchi). For example, Yamauchi's tape is wound onto a mandrel while still in the liquid form, and is wound only in the machine direction; there is no CD component. The disadvantage is that if the fiber-to-resin bond breaks down, the reinforcement is lost in all directions. The present invention eliminates this disadvantage by using a tape 10 that is in a solid state (dry) and placed in both MD and CD directions to maximize stability. Further, the continuous filaments 14 as shown in FIG. 1 offer superior reinforcement as they do not rely on resin bonding to obtain their strength. That is, if for any reason the resin looses its integrity, the filaments 14 still provide reinforcement.

Although a preferred embodiment has been disclosed and described in detail herein, its scope should not be limited thereby; rather its scope should be determined by that of the appended claims. For example, the belt of the present invention can also be used for shoe press belts used in shoe calenders or other applications which will be apparent to those skilled in the art.

What is claimed is:

1. A method for manufacturing a belt structure comprising the steps of:

providing tapes made of resin surrounding a fibrous matrix;

applying CD oriented tapes to the surface of a mandrel;

applying MD oriented tapes over the CD tapes;

applying pressure and heat to the mandrel containing the CD and MD tapes so to melt the resin and encapsulate the fibrous matrix;

treating the belt structure thus obtained to set; and grinding at least a surface of the belt structure to a desired caliper.

2. The method claimed in claim 1, wherein the resin is thermoplastic and is caused to thermoset during the step of treating the belt structure.

3. The method claimed in claim 1, further comprising the step of forming grooves or blind drilled holes on a surface of the belt structure.

4. The method claimed in claim 1, wherein pressure is applied by wrapping a shrinkable film around the mandrel containing the CD and MD tapes.

5. The method claimed in claim 1, wherein the resin is a solid thermoplastic elastomeric resin containing irradiation activated cross linking compounds.

6. The method claimed in claim 1, wherein radiation energy is applied to thermoset the resin.

7. The method claimed in claim 1 further comprising the step of cooling the resin-encapsulated matrix to solidify the resin, after the heating step.

8. The method claimed in claim 1, wherein some or all of the tapes comprise rubber.

9. The method claimed in claim 1 further comprising the step of repairing defects on the belt structure.

10. The method claimed in claim 1, wherein the fibrous matrix provides reinforcement and includes one of continuous fiber filaments, woven tapes, and knitted tapes with continuous reinforcing threads.

11. The method claimed in claim 1, wherein said MD tapes are applied in a spiral fashion.

12. The method claimed in claim 1, wherein the order of layering the MD and CD tapes is reversed.

13. The method claimed in claim 1, wherein at least one resin layer is applied to the mandrel surface prior to applying the MD and CD tapes.

14. The method claimed in claim 1, wherein at least one resin layer is applied over the MD and CD tapes after the tapes are in place.

15. The method claimed in claim 1, wherein at least one resin layer is applied between the MD and CD tapes but not fully cured.

16. The method claimed in claim 1, wherein the belt structure is one used as a shoe press belt for use in shoe calenders.

17. A belt structure made in a manner comprising the steps of:

providing tapes made of resin surrounding a fibrous matrix;

applying CD oriented tapes to the surface of a mandrel;

applying MD oriented tapes over the CD tapes;

applying pressure and heat to the mandrel containing the CD and MD tapes so to melt the resin and encapsulate the fibrous matrix;

treating the belt structure thus obtained to cause a jelling of the resin; and grinding at least a surface of the belt structure to a desired caliper.

18. The belt structure claimed in claim 17, wherein the resin is thermoplastic and is caused to thermoset during the step of treating the belt structure.

19. The belt structure claimed in claim 17, further comprising the step of forming grooves or blind drilled holes on a surface of the belt structure.

20. The belt structure claimed in claim 17, wherein pressure is applied by wrapping a shrinkable film around the mandrel containing the CD and MD tapes.

21. The belt structure claimed in claim 17, wherein the resin is a solid thermoplastic elastomeric resin containing irradiation activated cross linking compounds.

22. The belt structure claimed in claim 17, wherein radiation energy is applied to thermoset the resin.

23. The belt structure claimed in claim 17, further comprising the step of cooling the resin-encapsulated matrix to solidify the resin, after the heating step.

24. The belt structure claimed in claim 17, wherein some or all of the tapes comprise rubber.

25. The belt structure claimed in claim 17, further comprising the step of repairing defects on the belt structure.

26. The belt structure claimed in claim 17, wherein the fibrous matrix provides reinforcement and includes one of continuous fiber filaments, woven tapes, and knitted tapes with continuous reinforcing threads.

27. The belt structure claimed in claim 17, wherein said MD tapes are applied in a spiral fashion.

28. The belt structure claimed in claim 17, wherein the order of layering the MD and CD tapes is reversed.

29. The belt structure claimed in claim 17, wherein at least one resin layer is applied to the mandrel surface prior to applying the MD and CD tapes.

30. The belt structure claimed in claim 17, wherein at least one resin layer is applied over the MD and CD tapes after the tapes are in place.

31. The belt structure claimed in claim 17, wherein at least one resin layer is applied between the MD and CD tapes but not fully cured.

32. The belt structure claimed in claim 17, wherein the belt structure is a shoe press belt.

\* \* \* \* \*